United States Patent [19]

Doshi

[11] Patent Number: 4,783,203
[45] Date of Patent: Nov. 8, 1988

[54] INTEGRATED PRESSURE SWING ADSORPTION/MEMBRANE SEPARATION PROCESS

[75] Inventor: Kishore J. Doshi, Somers, N.Y.

[73] Assignee: Union Carbide Corporation, Danbury, Conn.

[21] Appl. No.: 111,452

[22] Filed: Oct. 22, 1987

[51] Int. Cl.⁴ ............... B01D 53/04; B01D 53/22
[52] U.S. Cl. ............................. 55/16; 55/26; 55/62; 55/68; 55/75; 55/158; 55/179; 55/389
[58] Field of Search ............ 55/16, 25, 26, 62, 68, 55/74, 75, 158, 179, 389

[56] References Cited

U.S. PATENT DOCUMENTS

| 3,430,418 | 3/1969 | Wagner | 55/25 |
| 3,986,849 | 10/1976 | Fuderer et al. | 55/25 |
| 4,229,188 | 10/1980 | Intille | 55/16 |
| 4,238,204 | 12/1980 | Perry | 55/16 |
| 4,264,338 | 4/1981 | Null | 55/16 |
| 4,398,926 | 8/1983 | Doshi | 55/16 |
| 4,639,257 | 1/1987 | Duckett et al. | 55/16 |
| 4,645,516 | 2/1987 | Doshi | 55/16 |
| 4,690,695 | 9/1987 | Doshi | 55/16 |
| 4,701,187 | 10/1987 | Choe et al. | 55/26 X |
| 4,723,966 | 2/1988 | Fuderer | 55/26 |

FOREIGN PATENT DOCUMENTS

| 151304 | 9/1983 | Japan | 55/16 |
| 1536995 | 12/1978 | United Kingdom | |

Primary Examiner—Robert Spitzer
Attorney, Agent, or Firm—Morris N. Reinisch

[57] ABSTRACT

An integrated pressure swing adsorption/membrane separation process is disclosed for the separation and purification of at least one gas component of a feed gas in which the purge effluent from the pressure swing adsorption part of the system is passed through a membrane separation unit to produce a non-permeate which is utilized as a displacement gas in the pressure swing adsorption part of the system. Desirably, the permeate is also utilized as a purge gas or repressurization gas. The apparatus for carrying out the process is also disclosed.

23 Claims, 2 Drawing Sheets

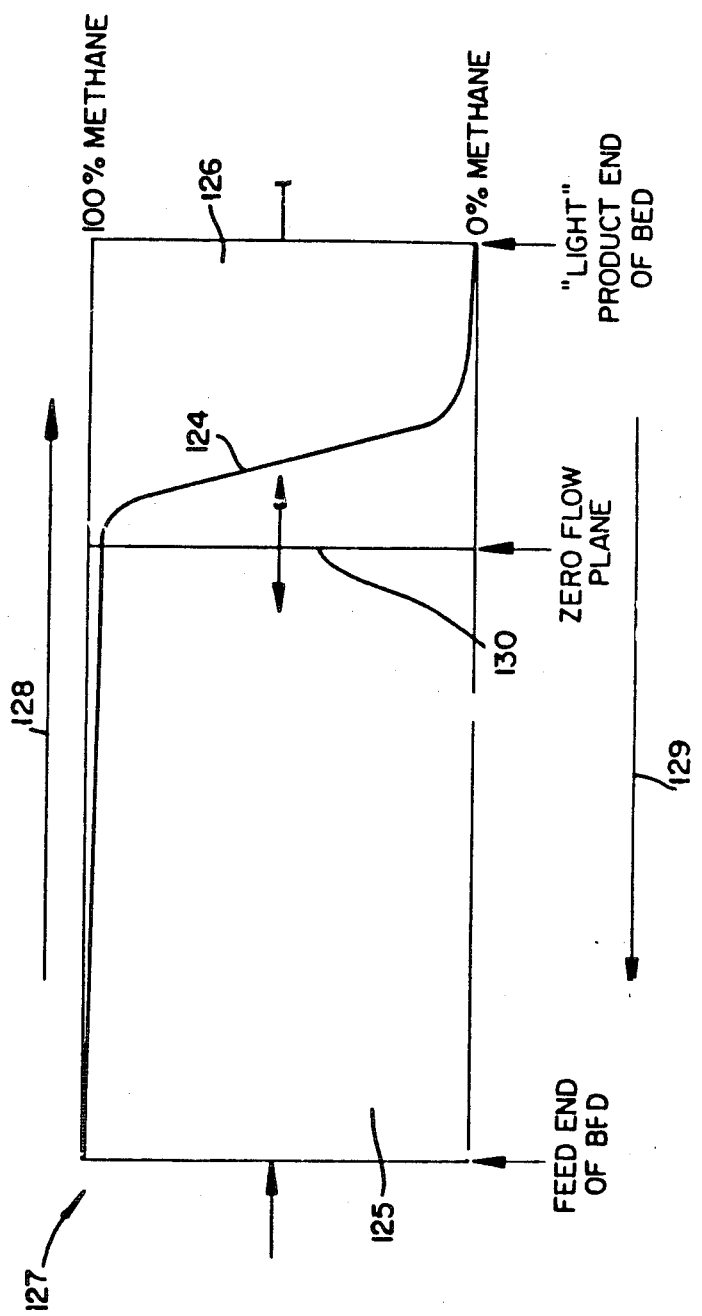

INTEGRATED PRESSURE SWING ADSORPTION/MEMBRANE SEPARATION PROCESS

BACKGROUND OF THE INVENTION

1. Field of the Invention

This invention pertains to the field of separating and purifying at least one gas component of a feed gas by a pressure swing adsorption (PSA) process. More particularly, the present invention relates to an integrated pressure swing adsorption/membrane separation process for the separation and purification of at least one gas component of a feed gas in which purge effluent from the PSA system is passed through a membrane separation system and the resulting non permeate is then utilized as a displacement gas or a copurge in the PSA system.

2. Discussion of Related Art

The PSA process is a well known means for separating and purifying a less readily adsorbable gas component contained in a feed gas mixture from a more readily adsorbable second component.

Pressure swing adsorption systems generally involve passage of the feed gas mixture through equipment comprising two or more adsorbers containing beds of molecular sieves or other adsorbents which selectively adsorb the heavier components of the gas mixture. The adsorbers are arranged to operate in sequence with suitable lines, valves, timers and the like so there are established an adsorption period during which the heavier components of the feed gas mixture are adsorbed on the molecular sieve or other adsorbent and a regeneration period during which the heavier components are desorbed and purged from the adsorbent to regenerate it for reuse.

Such selective adsorption commonly occurs in the adsorption beds at an upper adsorption pressure, with the more selectively adsorbable component thereafter being desorbed by pressure reduction to lower desorption pressure. The beds can be purged at such lower pressures for further feed gas purification.

Such PSA processing is disclosed in U.S. Pat. No. 3,430,418 to Wagner and in U.S. Pat. No. 3,986,849 to Fuderer et al., wherein cycles based on the use of multi-bed systems are described in detail. As is generally known and described in these patents, the contents of which are incorporated herein by reference as if set out in full, the PSA process is generally carried out in a sequential processing cycle that includes each bed of the PSA system. Such cycles are commonly based on the release of void space gas from the product end of each bed in one or more cocurrent depressurization steps upon completion of the adsorption step. In these cycles, the released gas typically is employed for pressure equalization and for subsequent purge steps. The bed is thereafter countercurrently depressurized and/or purged to desorb the more selectively adsorbed component of the gas mixture from the adsorbent and to remove such gas from the feed end of the bed prior to the repressurization thereof to the adsorption pressure.

PSA processes were first used for gas separations in which only one of the key components was recovered at high purity. For example, from 100 moles feed gas containing 80 moles hydrogen and 20 moles carbon monoxide, the process of Wagner, U.S. Pat. No. 3,430,418, could separate 60 moles of hydrogen at 99.999% purity, but no pure carbon monoxide could be recovered; 20 moles of carbon monoxide and 20 moles of hydrogen remained mixed at 50% purity each. A complete separation could not be made. Only the less adsorbable, light component was recovered at high purity.

For the recovery of a pure, more strongly adsorbed heavy component, an additional step was necessary, namely, rinsing of the bed with a heavy component to displace the light component from the bed prior to depressurization. This rinsing step is described in several earlier patents. The problems with these processes are the following: (a) if the rinsing is complete and the light component is completely displaced from the bed, pure heavy component can be obtained, but the adsorption front of the heavy component breaks through to the light component and the latter cannot be recovered at high purity; (b) if the displacement of the light component is incomplete, the typical concentration profile of the heavy component in the bed as indicated at FIG. 2 of the present application is obtained, and if such bed is depressurized countercurrently to recover the heavy key component at the feed end, the light component still present in the bed reaches the feed end very rapidly and the purity of the heavy component drops. It is therefore not practical with the prior art processes to obtain both key components at high purity in a single PSA unit.

Such complete separations can be obtained, however, by two separate pressure swing adsorption processing units wherein each unit includes several fixed beds. From a feed gas containing, for example, hydrogen and carbon monoxide (CO), the first unit recovers pure hydrogen and a carbon monoxide rich gas containing 70 percent carbon monoxide. This gas mixture is compressed and passed through a second PSA unit which recovers pure carbon monoxide and a hydrogen rich gas. The hydrogen rich gas can be added as feed gas to the first PSA unit and then the cycle is repeated. The combination of the two independent PSA units can make an excellent separation at very high flexibility. For example, from a gas mixture with two components this system can recover more than 99.8 percent of the adsorbable "light" component such as hydrogen at a purity of 99.999 percent and also recover essentially 100 percent of the more readily adsorbed, heavy component, such as carbon monoxide, at a purity higher than 99.5 percent.

A PSA process suitable for the recovery of both the less and more readily adsorbable components is described in British patent No. 1,536,995 to Benkmann. The process is based on two beds in series cycle as shown in FIG. 2 of Benkmann. The feed is introduced to the lower bed which retains the more readily adsorbable component. The feed step is followed by a copurge step in which the less readily adsorbable or light component is displaced in the lower bed by a recycled stream of heavy components, so that the lower bed at the end of the step contains only the heavy component. At this moment, the connection between the upper and lower beds is interrupted by an automatic valve and the heavy product is recovered from the lower bed by (countercurrent) depressurization. The upper bed is, in the meantime, also depressurized and purged to remove all of the heavy component. The step sequence of the upper and lower bed are interlocked and cannot be run with independent cycles. The flexibility of this system is therefore reduced while the complexity is increase. Problems with this system are: a set of two beds in series is needed; if process conditions such as feed gas composition change, it is not possible to change the volume ratio of the two beds which means lower flexibility; the vessel heads of the two beds contain more void space gas which increases depressurization loss and compressor power; and the pressure drop is also increased.

In copending, commonly assigned U.S. Pat. No. 4,723,966, issued Feb. 9, 1988, the contents of which are incorporated herein by reference as if set out in full, a PSA method is disclosed in which binary separations are achieved in single adsorption beds. Thus, after the adsorption step has proceeded to a point where the bed is sufficiently charged, the gas mixture within the bed is displaced or substituted with a gas stream containing the more readily adsorbable components. After this non-displacement step, the feed end of the bed contains substantially pure, more readily adsorbable components and the outlet end of the bed contains substantially pure, less adsorbable components. The thusly polarized bed is then depressurized simultaneously from both ends, thereby removing the separated, substantially pure components from their respective ends.

Attempts to purify gas streams employing other means have also been attempted, particularly utilizing semi-permeable membranes. However, such semi-permeable membrane gas separation processes, while able to separate the less permeable component, i.e., the non permeate stream, at relatively high purity, generally have not been capable of providing permeating components at high purity. Indeed, even with two- or three-stage permeation, as illustrated in U.S. Pat. No. 4,264,338, only moderate purity of the permeate stream is obtained in conjunction with costs which are economically unattractive.

Itegration of semi-permeable membrane units with PSA systems have also taken place. Thus, in U.S. Pat. No. 4,229,188 and 4,238,204, a semi-permeable membrane separation unit is utilized to treat purge gas obtained from the regeneration of a selective adsorption bed wherein the permeated light gas is recycled with the feed gas mixture for further treatment in the selective adsorption bed and the non-permeated heavy gas is entirely removed from the system and generally utilized as a fuel gas.

In a more recent application of the use of a semi-permeable membrane in conjunction with a PSA process, as disclosed in U.S. Pat. No. 4,398,926, a feed gas containing a high concentration of impurities is first passed through a separator containing a permeable membrane capable of selectively permeating hydrogen. The separator is used to achieve a bulk separation of the desired hydrogen from the impurities contained in the gas stream. The separated hydrogen is recovered at a reduced pressure and is passed to the pressure swing adsorption which is adapted for operation at the reduced pressure. The non-permeated gas from the separator is recovered essentially at the higher pressure of the gas stream and a portion thereof is throttled to a lower pressure and passed through the pressure swing adsorption system as a co-feed gas.

There accordingly still remains a desire in the art to more effectively and economically utilize semi-permeable membrane separation techniques in conjunction with PSA systems for the purification of gas mixtures.

SUMMARY OF THE INVENTION

Applicant has discovered a new integrated pressure swing adsorption/membrane separation system for the separation and purification of gas mixtures which more efficiently and economically utilizes the purge effluent derived from the pressure swing adsorption part of the system.

Thus, in the present invention, a feed gas mixture is passed through a selective adsorption unit having at least one adsorbent bed in which at least one gas component of the feed mixture is more adsorbable than less adsorbable gas components which are also contained within the feed gas mixture. The purge effluent leaving the adsorption unit is desirably treated with a membrane separation unit so as to provide a non-permeated gas, preferably at adsorption pressure, containing a higher concentration of the more adsorbable components then that contained within the feed gas mixture. This non-permeated gas is advantageously used as a displacement gas within the adsorption unit. So too, the permeated gas containing the less adsorbable components may be used for repressurization, as a purge gas, as a fuel, or as a product gas.

As used herein, the term "displacement gas" is meant to include a gas having a higher concentration of the more adsorbable components of the feed gas mixture. Once the adsorption step within the selective adsorption unit has proceeded to charge the bed sufficiently, the displacement gas is introduced into the bed thereby displacing the lesser adsorbable components located at the feed end of the bed, to the product end of the bed. This displacement step is highly desirable for obtaining high purity yields due to its providing for the polarization of the bed in which the charged area of the bed is substantially loaded with the more adsorbable gas components and the uncharged area of the bed contains the lesser adsorbable gas components. This allows for subsequent removal of the substantially pure heavy gas (containing the adsorbable gas components) and a light gas (containing the less adsorbable gas components) from the inlet end and product end of the beds, respectively.

More particularly, the new gas separation method of the present invention for removing at least one gas component from a feed gas mixture involves passing the feed gas mixture to at least one adsorbent bed maintained at an adsorption pressure in which bed the at least one gas component is more adsorbable than less adsorbable gas components which are also contained within the feed gas mixture. The less adsorbable gas components contained within the bed are then displaced with a displacement gas having a concentration of the more adsorbable at least one gas component which is higher than that of the feed gas mixture. Preferably, a cocurrent depressurization step is carried out before, simultaneous with or subsequent to this displacement step in order to depressurize the bed from the product end thereof and allow the release of void space gas which is comprised primarily of the less adsorbable gas components.

The bed is then further depressurized by at least countercurrent depressurization in which substantially the more adsorbable at least one gas component is released from the inlet end of the bed. In a preferred embodiment of the present invention, both ends of the bed are simultaneously depressurized to release the more adsorbable at least one gas component from the inlet end of the bed and the less adsorbable gas components from the product end of the bed. In this manner, the present invention provides for binary gas separation from a plurality of single adsorption beds.

After depressurization, the bed is regenerated by purging the bed with a purge gas. The purge effluent obtained from this purging step which contains the more adsorbable at least one gas component and the less adsorbable gas components is then passed through a semi-permeable membrane separation unit. In this separation unit, the more adsorbable at least one gas component is concentrated and forms the non-permeate, while the less adsorbable gas components pass through the membrane to form the permeate. At least a portion of the non-permeate is recycled to the adsorption unit to provide the said displacement gas. If desired, the gas leaving the inlet end of the adsorption bed during countercurrent or double ended depressurization, containing the at least one more adsorbable component, may also be used as a displacement gas to supplement the non-permeate. The remaining portion of the non-permeate may be used as a product gas or as a fuel, if so desired. The permeate may be used for repressurization, as a purge gas, as a fuel, or as a product gas. Preferably, prior to passing the purge effluent to the semi-permeable membrane separation unit, the effluent is first compressed to the adsorption pressure, which pressure is substantially equivalent to the pressure of the feed gas mixture. If desired, however, the effluent may be compressed to a pressure which is less than the adsorption pressure.

The bed is then repressurized to the adsorption pressure for further treatment of additional feed gas mixture.

The present invention is also directed to a gas separation system which is used to carry out the method discussed above. In particular, the gas separation system comprises a selective adsorption unit having at least one adsorbent bed in which the at least one gas component is more adsorbable than less adsorbable gas components contained within the feed gas mixture. The adsorption unit has at least one feed inlet, a first outlet for a product comprising less adsorbable gas components contained from the feed gas mixture, a second outlet for purge effluent, a second inlet for introducing displacement gas, and means for feeding the gas mixture to the at least one feed inlet and means for recovering the product gas from the first outlet.

The system also contains a semi-permeable membrane separation unit comprising at least one semi-permeable membrane which is selectively permeable to the less adsorbable gas components. This unit has a gas inlet, a first outlet for permeated gas, and a second outlet for non-permeated gas.

The system also contains means for directing the purge effluent from the second outlet of the adsorption unit to the gas inlet of the membrane separation unit, and means for directing the non-permeated gas from the second outlet of the membrane separation unit to the second inlet of the adsorption unit for introducing the non-permeating gas to be used as a displacement gas in the adsorption unit.

Accordingly, the present invention advantageously provides for the efficient recycling of the purge effluent by means of the utilization and integration of a semi-permeable membrane separation unit wherein the resulting non-permeate is utilized as a displacement gas and the permeate gas may be utilized for repressurization, as a purge gas, as a fuel, or as a product gas.

In the preferred embodiment of the present invention in which both ends of the bed are simultaneously depressurized, a binary gas separation is obtained in a most economical and efficient manner as a result of the integrated PSA/membrane system of the present invention.

BRIEF DESCRIPTION OF THE DRAWINGS

FIG. 2 is a graphical representation of the conditions in one of the adsorption beds of FIG. 1.

DETAILED DESCRIPTION OF THE INVENTION

Figure 1:
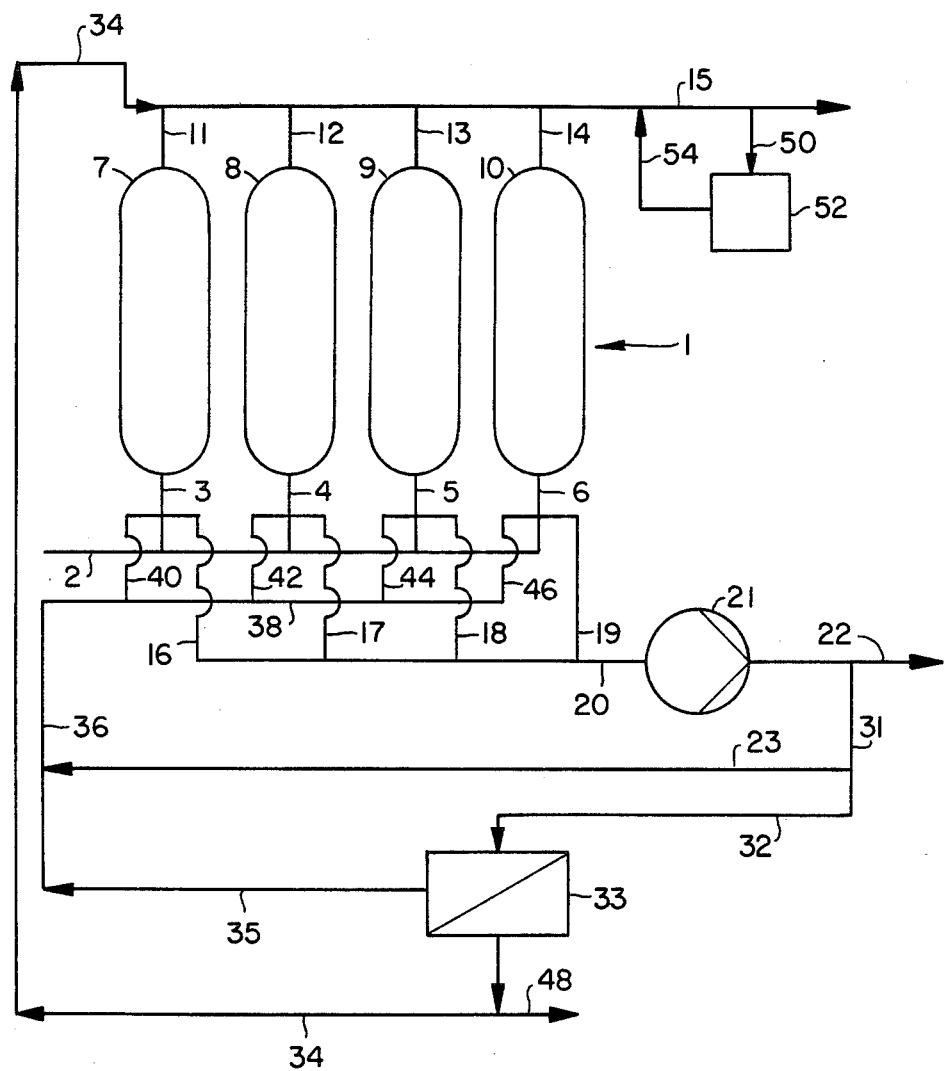
FIG. 1 is a diagramatic presentation of an apparatus for performing one embodiment of the present invention.

It is within the scope of the present invention to separate any feed gas mixture containing at least one more readily adsorbable component from less readily adsorbable components which are also contained within the feed gas mixture. Typical more readily adsorbable gaseous components include oxygen, methane, carbon monoxide, and the like. Generally, lesser adsorbable materials include nitrogen, hydrogen, and the like.

Those skilled in the art will appreciate that high pressure selective adsorption utilizing a PSA system comprises introducing the feed gas mixture to the feed end of an adsorbent bed at a high adsorption pressure. The less readily adsorbable component generally passes through the bed and is discharged from the product end thereof, although some less readily adsorbable gas components remain in the bed and occupy the voids between the adsorbent material. An adsorption front or fronts are established in the bed with the said front likewise moving through the bed from the feed end toward the product end thereof.

Adsorption is allowed to proceed under pressure until a mass transfer front is located in an "ideal" position within the bed. The mass transfer front is the demarcation line between a charged adsorbent material, such as material that has been saturated, and uncharged adsorbent material. The adsorption step desirably proceeds until the mass transfer front is at least about halfway through the bed.

Once the adsorption step has proceeded to a point wherein the bed is sufficiently charged, the gas mixture is displaced or substituted with a gas having a higher concentration of the more adsorbable component, preferably a concentration of the more adsorbable gas components which is at least higher than that of the feed gas mixture.

In accordance with the present invention, displacement gas is obtained from a membrane separation unit which enables the recycling of purge effluent obtained from a subsequent step in the adsorption process. This displacement step displaces lesser adsorbable components from the feed end of the bed to the product end of the bed and is highly desirable for obtaining high purity yields ensuring that the charged area of the bed is substantially loaded with only the more adsorbable components. The uncharged area of the bed contains the lesser adsorbable components.

It is desirable during cyclic operations of the PSA unit to maintain the mass transfer front at a specific location within the bed. A cocurrent depressurization step is optionally, but preferably, performed in order to control the position of the mass transfer front. The cocurrent depressurization step can precede, coincide with, or follow the displacement ste. Moreover, the cocurrent depressurization step can also be carried out both before and during such displacement step, or during and after such displacement step, or any other combination thereof. The cocurrent depressurization step is generally carried out by lowering the pressure at the product end of the adsorbent bed. Cocurrent depressurization is essentially a small purge step and is effective for positioning the mass transfer front.

Once the displacement step has been carried out, the bed may be characterized as being polarized. The feed end of the bed contains substantially pure and more adsorbable components. The product end of the bed contains the lesser adsorbable components.

The polarized bed is then at least countercurrently depressurized in a manner which is conventional in the art in which gas is allowed to leave the inlet end of the bed, said gas primarily comprising the more adsorbable gas components of the feed gas mixture. This gas may be used as product, as a fuel, or, if desired, as a supplemental source for displacement gas.

In a preferred embodiment of the present invention, the adsorption bed is depressurized from both ends simultaneously, such as by a double-ended depressurization step. This procedure recovers substantially pure adsorbable components from the feed end of the bed and substantially pure lesser adsorbable components from another point of the bed, generally from the product end of the bed.

Double-ended depressurization is performed by simultaneously lowering the pressure of the system from both ends of the adsorption bed. A zero flow plane is established in close proximity to the mass transfer front. The adsorbable components unload countercurrently from the feed end side of the bed, while the lesser adsorbable components unload cocurrently from the product end side of the adsorption bed.

At the completion of the at least countercurrent depressurization step, which preferably is a double-ended depressurization step, the bed is purged countercurrently from the product end with void space gas or a gas having a high concentration of the less adsorbable components in a manner which is conventional in the art. Purge effluent is recovered from the feed end of the bed.

In accordance with the present invention, the purge effluent containing both more adsorbable and less adsorbable gas components of the feed gas mixture is then passed through a semi-permeable membrane which is substantially permeable to the less adsorbable or lighter components and substantially impermeable to the more adsorbable or heavier components. Generally, the purge effluent is compressed prior to being introduced into the semi-permeable membrane separation unit, desirably to the adsorption pressure of the adsorbent bed which is gnerally in the range of from about 60 to about 1,000 pounds per square inch vaue (PSIG).

The lighter or less adsorbable components are recovered as a permeate at lower pressure and may be utilized as a product gas, a purge gas, fuel, repressurization gas or as pressure equalization gas. The concentrated heavier or more adsorbable component is obtained as the non-permeate and is utilized, at least in part, as the displacement gas. The remaining part of the non-permeate may be used as a product gas, or as a fuel, if so desired.

In the embodiment in which the gas leaving the inlet end of the adsorption bed during countercurrent or double ended depressurization containing the at least one more adsorbable component is also used as a displacement gas as a supplement to the non-permeate, it is desired to utilize the non-permeate as the displacement gas for a particular bed prior to using the gas obtained from depressurization.

The method of the present invention is completed with the repressurization of the adsorption bed to the adsorption pressure in a manner which is conventional in the art. Preferably, the permeate from the membrane separation unit is utilized, in part, in the repressurization step.

The membrane separation unit consists of one or more membrane modules comprising semi-permeable membranes mounted in a suitable housing and provided with manifolds and associated with an inlet and separate outlets for non-permeated and permeated gas mixture. Desirably, the membrane modules take the form of hollow fiber membrane modules. Inlet means are provided for passing purge effluent under pressure to the feed inlet portion of the module. Outlet means are provided for withdrawing permeate gas from the module at a reduced pressure. Other outlet means are provided for separately withdrawing the non-permeate portion of the gas stream from the separating unit essentially at the feed gas pressure. The inlet portion of the module and the non-permeate gas outlet means are preferably in fluid communication with the inside of the hollow fibers. It is possible, however, to supply the purge effluent feed to the bores of the fibers as well although this embodiment is not as desirable as passing the feed to the outside or shell side of the membrane modules.

In the most desirable embodiments of the present invention, the non-permeate gas outlet means and the permeate gas outlet means are at opposite ends of the membrane module with the feed inlet means being positioned near the permeate gas outlet means. In operation, the pressurized effluent enters the separator and the less adsorbable gas components selectively permeates the hollow fiber walls. The permeate gas passes through the interior of the fiber bores at reduced pressure and is delivered to its outlet means at one end of the membrane module, while non-permeate gas passes to the outlet means for such gas typically at the opposite end of the membrane module.

Generally, the selectivity or separation of a membrane is described in terms of the ratio of the permeability of the fast permeating gas, e.g., hydrogen, to the permeability of a slower permeating gas, such as carbon monoxide or methane, wherein the permeability (P/I) of the particular gas through the membrane can be defined as the volume of gas at standard temperature and pressure which passes through the membrane per square centimeter of separating surface area per second for a partial pressure drop of one centimeter of mercury across the membrane. The ratio of the permeabilities of the two specific gases is referred to as the separation factor of the first gas in respect to the second gas (S.F.$H_2$/CO or $\alpha H_2$/CO). Desirably, the separation factor for hydrogen over carbon monoxide or methane, for example, will be at least 5 and preferably at least about 10. Separation factors for hydrogen over carbon monoxide or methane of 50 or 100 or greater may be provided by certain membranes. Particularly desirable membranes exhibit hydrogen permeabilities of at least $1 \times 10^{-6}$ and preferably from $1 \times 10^{-5}$ to $4 \times 10^{-4}$ cubic centimeters of hydrogen at standard temperature and pressure per square centimeter of membrane surface area per second at a partial pressure drop of one centimeter of mercury across the membrane.

Any suitable material selectively permeable to the less adsorbable gas components of the feed gas mixture, such as hydrogen, as compared to the heavier more adsorbable gas components such as carbon monoxide, methane, nitrogen and other gases may be employed for the separation membranes and the preferred hollow fiber separation membranes.

Suitable membrane materials include metallic and inorganic membranes as well as organic polymers or organic polymers mixed with inorganics such as fillers, reinforcements and the like. Typical organic polymers which are suitable for the formation of planar and hollow fiber membranes can be substituted or unsubstituted polymers and may be selected from polysulfones; polystyrenes, including styrene-containing polymers such as acrylonitrile-styrene copolymers, styrene-butadiene copolymers and styrene-vinylbenzyl halide copolymers; polycarbonates, cellulosic polymers, such as cellulose acetate, cellulose acetate-butyrate, cellulose propionate, ethyl cellulose, methyl cellulose, nitrocellulose, etc.; polyamides and polyimides, including aryl polyamides and aryl polyimides; polyethers, polyarylene oxides, such as polyphenylene oxide and polyxylene oxide; polyesteramide diisocyanates, polyurethanes; polyesters, including polyacrylates, such as polyethylene terephthalate, polyalkyl methacrylates, polyalkyl acrylates, polyphenylene terephthalate, etc.; polysulfides; polymers from monomers having $\alpha$-olefinic unsaturation other than mentioned above such as polyethylene, polypropylene, polybutene-1, poly-4-methylbutene-1; polyvinyls, e.g. polyvinylchloride, polyvinylfluoride, polyvinylidene chloride, polyvinylidene fluoride, polyvinyl alcohol, polyvinyl esters such as polyvinyl acetate and polyvinyl propionate, polyvinyl pyridines, polyvinyl pyrrolidones, polyvinyl ethers, polyvinyl ketones, polyvinyl aldehydes such as polyvinyl formal and polyvinyl butyral, polyvinyl amines, polyvinyl phosphates and polyvinyl sulfates; polyallyls; polytriazoles; polybenzimidazoles; polyphosphazines, etc., and interpolymers including block interpolymers containing repeating units from the above such as terpolymers of acrylonitrile-vinylbromide-sodium salt of p-sulfophenylmethallyl ether; and grafts and blends containing any of the foregoing. Typical substituents providing substituted polymers include halogens such as flourine, chlorine and bromine; hydroxyl groups; lower alkyl groups; lower alkoxy groups monocyclic aryl; lower acyl groups and the like.

The membrane material is preferably as thin as possible in order to improve the rate of permeation through the membrane, yet of sufficient thickness to insure adequate strength to the membrane to withstand the separation conditions, including differential pressures and differential partial pressures employed. Membranes and hollow fiber membranes may be isotropic, i.e., have substantially the same density throughout, or they may be anisotropic, i.e., having at least one zone of greater density than at least one other zone of the membranes. The membranes may be chemically homogeneous, i.e., constructed of the same material, or they may be composite membranes. Suitable composite membranes may comprise a thin layer which effects the separation on a porous physical support which provides the necessary strength to the composite membrane to withstand the separation. These membranes comprise a porous separation membrane which substantially effects the separation and a coating material in occluding contact with the porous separation membrane wherein the material of the coating does not substantially effect the separation. These multicomponent membranes are particularly attractive for gas separations wherein hydrogen is separated from carbon monoxide, methane, nitrogen and the other heavier gases in that good selectivity for separation and high flux of hydrogen through the membranes can be obtained.

The materials for the coating of these multicomponent membranes may be natural or synthetic substances, and are often polymers, which advantageously exhibit the appropriate properties to provide occluding contact with the porous separation membrane. Synthetic substances include both addition and, condensation polymers. Typical of the useful materials which can comprise the coating are polymers which can be substituted or unsubstituted and which are solid or liquid under gas separation conditions, and include synthetic rubbers; natural rubbers; relatively high molecular weight and/or high boiling liquids; organic prepolymers; polysiloxanes, silicone polymers; polysilazanes; polyurethanes; polyepichlorohydrins; polyamines, polyimines; polyamides; acrylonitrile containing copolymers such as poly($\alpha$-chloroacrylonitrile) copolymers; polyesters including polyacrylates, e.g., polyalkyl acrylates and polyalkyl methacrylates, wherein the alkyl groups have from 1 to about 8 carbon atoms, polysuccinates, and alkyd resin; terpenoid resins; linseed oil; cellulosic polymers; polysulfones, especially aliphatic-containing polysulfones; polyalkylene glycols such as polyethylene glycol, polypropylene glycol, etc.; polyalkylene polysulfates; polypyrrolidones; polymers from monomers having olefinic unsaturation such as polyolefins, e.g., polyethylene, polysproplene, polybutadiene, poly(2,3-dichlorobutadienes), polyisopropene, polychloroprene; polystyrene, including polystyrene copolymers, e.g., styrene butadiene copolymers; polyvinyls such as polyvinyl alcohol, polyvinyl aldehydes, e.g., polyvinyl formal and polyvinyl butyral, polyvinyl ketones, e.g., polymethylvinyl ketone, polyvinyl esters, e.g., polyvinyl benzoates, polyvinyl halides, e.g., polyvinyl bromide; polyvinylidene halides; polyvinylidene carbonates; poly(N-vinylmaleamide); etc., poly(1,5-cyclooctadiene); poly(methylinopropenyl ketone); fluorinated ethylene copolymers; polyarylene oxides, e.g., polxylylene oxides; polycarbonates; polyphosphates, e.g., polyethylene methyl phosphate; and the like; and any interpolymers including the interpolymers containing repeating units from the above, and grafts of blends containing any of the foregoing. The materials may or may not be polymerized after application to the porous separation membrane.

In accordance with the present invention, means are provided for directing the non-permeated as containing the more adsorbable components from one of the outlets of the membrane separation unit to the inlet end of the adsorption unit thereby recycling the non-permeated gas to be utilized as a displacement gas during the adsorption cycle.

Similarly, means may also be provided in a further embodiment of the present invention to direct the permeated gas containing the less adsorbable components from one of the outlets of the membrane separation unit to the product end of adsorption unit thereby recycling this permeated gas as well to be utilized as a purge gas, a pressure equalization gas, and/or a repressurization gas.

The adsorbent bed may comprise a material that contains a member selected from the group consisting of zeolitic molecular sieves, activated carbon, silica gel, activated alumina, and mixtures thereof. Those skilled in the art recognize that virtually any selectively adsorbent material may be used in the process of the present invention.

FIG. 1 is a diagramatic representation of a single PSA system 1 representing an adsorption unit of the present invention. While the discussion of the Figures will generally be directed to the preferred embodiment of the present invention in which double ended depressurization takes place, it is to be understood that such simultaneous depressurization from both ends of the bed is not critical to the present invention and that conventional countercurrent depressurization is also applicable. Four adsorbent beds 7, 8, 9, and 10 are shown for this embodiment in parallel, but only one bed is necessary to practice the invention.

A feed gas mixture comprising at least one gas component which is more adsorbable in the adsorbent bed then less adsorbable gas components which are also contained within the feed gas mixture is flowed under pressure into the feed ends of the adsorbent beds 7, 8, 9, and 10, respectively, by way of a manifold line 2 and individual feed-end lines 3, 4, 5, and 6 until the concentration profile of the mass transfer front 124 of FIG. 2 is established. The initial flowing of the feed gas mixture onto the adsorbent bed is often referred to as charging or saturating the bed. During this the adsorbent material is selectively adsorbing the more adsorbable or heavier components of the feed gas mixture while allowing the less adsorbable or lighter components to pass through the bed and out of the product ends 11, 12, 13, 14, and 15. The gas passing out of the product end of the beds is essentially under feed or adsorption pressure and can be used as a product gas, purge gas, fuel, or as repressurization gas.

Once the adsorbent beds 7, 8, 9, and 10 have been charged, the feed gas is then displaced by a gas from downstream of the process provided by manifold line 38.

This downstream gas has a concentration of the more adsorbable gas components which is higher than that contained within the feed gas mixture such that flowing of the downstream gas into the feed ends 3, 4, 5, and 6 of the adsorbent beds 7, 8, 9, and 10 causes the less adsorbable components remaining in the feed-end of the beds to move towards the product end of the beds. This displacement of the feed gas with the downstream gas is desirable to achieve substantially pure separations in addition to a distinct mass transfer front, particularly when double-ended depressurization is carried out.

Preferably, a cocurrent depressurization step is performed in conjunction with the displacement step. Pressure is lowered to an intermediate level at the product ends 11, 12, 13, and 14 of the adsorbent beds 7, 8, 9, and 10. Void space gas comprising mostly the less adsorbable or light gas components are recovered at the product ends. The void space gas is flowed out of a manifold 15 to a line 50 and to a storage means 52 where it can be used in the subsequent step of purging countercurrently. The cocurrent depressurization step can be performed prior to, simultaneously with, or subsequent to the displacement step. The two steps are compatible as both the displaced gas and void space gas recovered from the product ends 11, 12, 13, and 14 have a high concentration of the less adsorbable or lighter gas components and thus can be combined in the storage means 52 to be used later as purge gas.

Ordinarily, mass transfer fronts can experience difficulties in single bed systems. For example, if the mass transfer front 124 of FIG. 2 is displaced from the bed 127, the less adsorbable product becomes impure. This is due to the adsorbent bed becoming saturated with the adsorbed material whereupon spillage of the adsorbed material into the relatively pure effluent product occurs. Impurities in the effluent product can also occur if the mass transfer front is allowed to remain inside of the bed when countercurrent depressurization begins. Material can flow in the direction of arrow 129, thus causing the less adsorbable material 126 located at the product end of the bed 127 to mix with the adsorbable material 125 when flowing out the feed end of the bed 127.

The concentration of impurities is reduced or avoided when both the feed end of bed 127 and the product end of bed 127 are simultaneously depressurized. Adsorbed material 125 flows in the direction of arrow 129 and the lesser adsorbed material flows in the direction of arrow 128. Substantially pure adsorbed material is obtained from the feed end of bed 127 and substantially pure less adsorbable material is obtained from the product end of bed 127.

FIG. 2 is an example of a concentration profile at the beginning of double-ended depressurization. As double-ended depressurization starts, a zero flow plane 130 is established. To the left of the zero flow plane 130, material in the bed flows countercurrently or in the direction of arrow 129. To the right of the zero flow plane 130, material flows cocurrently or in the direction of arrow 128. On both sides of the zero flow plane, the flow rate gradually increases and reaches a maximum at both ends of the bed.

Controlling the flow rates at both ends of the adsorbent bed during the preferred double-ended depressurization is desirable inasmuch as the relative flow rates at the ends of the adsorbent bed determine the position of the zero flow plane. The flow rates will, however, be different at both ends of the adsorbent bed since the effluent at the feed end of the bed is more voluminous than the effluent at the product end during such double-ended depressurization.

The reason for such differential unloading of the bed is twofold. Firstly, the portion of the bed charged with the more adsorbable component is generally larger. Secondly, more adsorbable material is liberated compared to less adsorbable material as the pressure is lowered simultaneously from both ends.

Double-ended depressurization is complete once the adsorbent bed is reduced to a desorption pressure.

The adsorption bed is regenerated after double-ended depressurization. Purge gas obtained from storage means 52 is flowed through a line 54 to the manifold 15 and into the beds 7, 8, 9, and 10 by way of the lines from the product ends 11, 12, 13, and 14. The purge gas is flowed from the product ends to the feed ends of the beds and, therefore, is said to be flowing "countercurrently". The beds are completely depressurized so the purge gas, which has an intermediate pressure level, flows readily through the beds. Lowering of the partial pressure of the adsorbed components is augmented by the purge with a gas having a high concentration of the non-adsorbed component.

As a result of the purge step, purge effluent is obtained at the feed-end lines 3, 4, 5, and 6 and manifold outlets 16, 17, 18, and 19. In accordance with the present invention, the purge effluent is flowed through the manifold at gas line 20 to compressor means 21 in which the effluent is compressed to adsorption pressure. The compressed effluent is then flowed through lines 31 and 32 and into membrane separation unit 33.

Membrane unit 33 separates the effluent into the two basic components, namely, the more adsorbable and the less adsorbable components. The membrane is a semi-permeable membrane being permeable to the less adsorbable components and impermeable to the more adsorbable components. The less adsorbable gaseous components flow out of the membrane separation unit 33 by way of line 34, which leads into product manifold 15. The gas flowing through line 34 has a high concentration of the less adsorbable components and can, therefore, be used as a product gas, countercurrent purge gas, a fuel, an equalization gas, or, in part, as a repressurization gas. Equalization for the purposes of this invention is achieved when the gas in line 34 is at a lower pressure than the adsorption pressure and can be used to enquilibrate pressures in other beds.

The more adsorbable gas components of the purge effluent become concentrated in membrane separation unit 33. The concentrated, more adsorbable components are returned to the adsorption unit of the system by way of lines 35 and 36 and manifold line 38 to manifold outlets 40, 42, 44, and 46. The non-permeated gas in line 35 may be used as a displacement gas or as a product gas. If desired, a portion of the non-permeated gas may be utilized as a product gas leaving the system via line 48.

The gas in gas line 20 may have a high concentration of the more adsorbable component as, for example, during double-ended depressurization. In this situation, flowing the gas through the membrane unit is superfluous. Accordingly, the gas in gas line 20 may be compressed in compressor 21 and then flowed through line 31, by-pass line 23, line 36 and manifold line 38 to be used as a displacement gas. Alternatively, all or portions of the gas coming out of compressor means 21 may be used as a product gas via line 22.

Once the adsorbent beds 7, 8, 9, and 10 have been purged, the beds are repressurized to the adsorption pressure. At this point, the regeneration of the beds is complete. The beds are then ready for another adsorption cycle wherein a feed gas mixture is flowed through the beds.

This invention is useful for a two-component gas mixture as well as for more complicated gas mixtures. For instance, air may be separated by the present invention into its various subcomponents by multi-cycling processing. Multiple cycles can be performed until the pure subcomponents are separated. In the first cycle, a complex gas mixture is loaded onto the beds. A displacement gas comprising essentially the most adsorbable components are separated from the feed end of the bed and the less adsorbable components are separated from the product end of the bed. Subsequent cycles can then be conducted to further separate the two products of the first cycle.

Those skilled in the art will recognize that the essential components of the pressure swing adsorption apparatus described herein are readily available in the marketplace. The various described lines can be any type of conduit means, pipes, tubes, hoses, or other similar materials. Compressors, valves, membrane units, pipe junctions, and storage means can all have conventional inlet and outlet means as well as valve means that may be electro-mechanical.

The following example is illustrative of the present invention and should not be construed as limiting it in any manner.

EXAMPLE

Five adsorbent beds are pressurized to an adsorption pressure of about 3 MPa. A feed gas mixture comprising a more adsorbable component, carbon monoxide, and a less adsorbable component, hydrogen, is flowed through a first manifold and feed end inlets into the adsorbent beds. The less adsorbable hydrogen is flowed out the product-end outlet into a second manifold where it is obtained as a product gas at 3 MPa. Once the mass transfer front has moved to a position where it is about halfway through the beds, the flow of the feed gas is interrupted.

Void space gas consisting essentially of hydrogen is removed from the beds by lowering pressure in the outlets to a pressure of about 1 MPa. The void space gas is then flowed through lines into a storage tank and used for repressurizing other beds.

A displacement step, also known as a cocurrent purge step, is then initiated by flowing a displacement gas containing 96% by volume of carbon monoxide through the first manifold, the inlets and the beds, thereby displacing hydrogen from the feed end of the beds towards the product end. The hydrogen exiting the outlets may be flowed to the storage tank utilized for the void space gas. Alternatively, a portion or all of the hydrogen, which is at 1 MPa, may also be used to repressurize other beds or may be removed from the system as hydrogen product.

After the cocurrent purge step, the bed is charged and polarized resulting in carbon monoxide being located in the feed-end half of the bed and hydrogen being located in the product end half of the bed.

Unloading of the beds is performed to achieve binary gas separations in one double-ended depressurization step. Pressure is lowered at both ends of the beds simultaneously to a pressure of about 120 KPa. Carbon monoxide at 98.8% purity is recovered at the feed end and 99.99% pure hydrogen is recovered at the product outlet end. This hydrogen is utilized to purge another bed.

After double-ended depressurization, the bed is purged with the hydrogen obtained from the double-ended depressurization of another bed. A purge effluent containing 62 mole % CO and 38 mole % $H_2$ is recovered from the outlets 16, 17, 18, and 19 whereupon the effluent is processed for return to the adsorption unit.

The purge effluent is flowed to a compressor in which the effluent is compressed to the adsorption pressure or slightly higher. The compressed gas is then flowed through a membrane separation unit. The permeate gas consisting of 87% $H_2$ at 120 KPa is flowed from the separation unit into the second manifold to be treated as a product gas or as a void space gas. The non-permeate gas containing 96% CO and 4% $H_2$ is flowed from the separation unit at essentially unchanged pressure into the first manifold 38 to be used as a displacement gas for the cocurrent displacement step.

What is claimed is:

1. In a pressure swing adsorption process containing at least one adsorption bed in which at least one more readily adsorbable gas component is separated from at least one less readily adsorbable gas component and in which a purge effluent is obtained during the purging of said adsorption bed, and further in which a displacement gas is introduced into the absorption bed to displace the at least one less readily absorbable gas component contained within the bed, the improvement which comprises passing at least a portion of the purge effluent through a membrane separation unit to concentrate the at least one more readily adsorbable gas component to form a concentrated gas stream and using said concentrated gas stream as the displacement gas in said pressure swing adsorption process.

2. A gas separation method for removing at least one gas component from a feed gas mixture comprising:
   (a) passing the feed gas mixture to at least one adsorbent bed maintained at an adsorption pressure in which the at least one gas component is more adsorbable than less adsorbable gas components contained within the feed gas mixture, said bed having a feed end and a product end;
   (b) displacing the less adsorbable gas components contained within the bed with a displacement gas having a concentration of the more adsorbable at least one gas component which is higher than that of the feed gas mixture;
   (c) depressurizing the bed by at least countercurrent depressurization in which substantially the more adsorbable at least one gas component is released from the inlet end of the bed;
   (d) purging the bed with a purge gas to obtain a purge effluent from the feed end of the bed, said purge effluent including said more adsorbable at least one gas component and said less adsorbable gas components;
   (e) repressurizing the bed to the adsorption pressure; and
   (f) concentrating the more adsorbable at least one gas component in said purge effluent with a semi-permeable membrane to provide at least a portion of the said displacement gas.

3. The method of claim 2 further including the step of cocurrently depressurizing the bed to allow the release of substantially the less adsorbable gas components from the product end of the bed either before, simultaneous with, or after the displacing step.

4. The method of claim 3, wherein the released less adsorbable gas components from the concurrent depressurization step is used at least in part of the repressurization of an adsorption bed.

5. The method of claim 2, wherein the depressurization of step (c) further comprises the simultaneous release of substantially the less adsorbable gas components from at least one other location of the bed.

6. The method of claim 5, wherein during the depressurization of step (c), substantially the less adsorbable gas components are released from the product end of the bed and substantially the more adsorbable at least one gas component is simultaneously released from the inlet end of the bed.

7. The method of claim 5, wherein the released less adsorbable gas components from the at least one other location is used for purging an adsorbent bed.

8. The method of claim 2, wherein said step of concentrating further comprises the step of compressing said purge effluent prior to being concentrated with the semi- permeable membrane.

9. The method of claim 8, wherein the purge effluent is compressed to adsorption pressure prior to being concentrated with the semi-permeable membrane.

10. The method of claim 9, wherein said step of concentrating further comprises the step of flowing the compressed effluent to the semi-permeable membrane which is selectively permeable to the less adsorbable gas components and recovering a non-permeate at adsorption pressure which is used as the said displacement gas and a permeate at a pressure less than adsorbtion pressure comprising substantially the less adsorbable gas components.

11. The method of claim 10, wherein the permeate is used for purging an adsorbent bed.

12. The method of claim 2, wherein the more adsorbable at least one gas component is a member selected from the group consisting of methane, carbon monoxide, oxygen and combinations thereof.

13. The method of claim 2, wherein the less adsorbable gas components are selected from the group consisting of hydrogen, nitrogen and combinations thereof.

14. The method of claim 2, wherein the membrane comprises a composite membrane having a porous support layer and a separation layer positioned on the support layer.

15. The method of claim 14, wherein the composite membrane is in hollow fiber form.

16. The method of claim 2, wherein the bed is repressurized to a pressure of from about 600 psig to about 1,000 psig.

17. A gas separation method for removing at least one gas component from a feed gas mixture comprising:
   (a) passing the feed gas mixture to at least one adsorbent bed maintained at an adsorption pressure in which the at least one gas component is more adsorbable than less adsorbable gas components contained within the feed gas mixture, said bed having a feed end and a product end;
   (b) cocurrently depressurizing the bed to allow the release of substantially the less adsorbable gas components from the product end of the bed;
   (c) displacing less absorbable gas components contained within the bed with a displacement gas having a concentration of the more adsorbable at least one gas component which is higher than that of the feed gas mixture;
   (d) depressurizing the bed by simultaneously allowing the release of substantially the more adsorbable at least one gas component from the inlet end of the bed and allowing the release of substantially the less adsorbable gas components from the product end of the bed;
   (e) purging the bed with a purgge gas to obtain a purge effluent from the feed end of the bed, said purge effluent including said more adsorbable at least one gas component and said less adsorbable gas components;
   (f) repressurizing the bed to the adsorption pressure;
   (g) compressing at least a portion of the purge effluent to adsorption pressure to form a compressed purge effluent; and
   (h) concentrating the more adsorbable at least one gas component in said compressed purge effluent with a semi-permeable membrane, wherein the membrane is selectively permeable to the less adsorbable gas components and recovering a non-permeate at adsorption pressure which is used as the said displacement gas and a permeate at a pressure lower than adsorption pressure comprising substantially the less adsorpable gas components.

18. A gas separation system for removing at least one gas component from a feed gas mixture comprising:

(a) a selective adsorption unit having at least one adsorbent bed in which the at least one gas component is more adsorbable than less adsorbable gas components contained within the feed gas mixture, said adsorption unit having at least one feed inlet, a first outlet for a product comprising the less adsorbable gas components, a second outlet for purge effluent, a second inlet for introducing displacement gas, means for feeding the feed gas mixture to the at least one feed inlet and means for recovering the product gas from the first outlet;

(b) a semi-permeable membrane separation unit comprising at least one semi-permeable membrane which is selectively permeable to the less adsorbable gas components having a gas inlet, a first outlet for permeated gas, and a second outlet for non-permeated gas; and (c) means for directing the purge effluent from the second outlet of the adsorption unit to the gas inlet of the membrane separation unit, and means for directing the non-permeated gas from the second outlet of the membrane separation unit to the second inlet of the adsorption unit for introducing the non-permeated gas to be used as a displacement gas in the adsorption unit.

19. The system of claim 18, wherein the means for directing the purge effluent includes a gas compressor, a conduit means from the adsorption unit to the gas compressor, and a conduit means from the gas compressor to the membrane separation unit.

20. The system of claim 18, wherein the membrane separation unit comprises semi-permeable membrane hollow fibers assembled within the separation unit.

21. The system of claim 20, wherein the gas inlet and the second outlet for non-permeated gas of the membrane separation unit are in fluid communication within said separation unit on the outside of said hollow fibers, and said first outlet for permeated gas being in fluid communication with the inside of said hollow fibers.

22. The system of claim 18, wherein the semi-permeable membrane is a composite membrane having a porous support layer and a separation layer positioned on the support layer.

23. The system of claim 18, which further includes means for directing the permeated gas from the first outlet of the membrane separation unit to the first outlet of the adsorption unit, for introducing the permeated gas as a purge gas in the adsorption unit.

* * * * *